(12) United States Patent
Yoo et al.

(10) Patent No.: US 12,573,715 B2
(45) Date of Patent: Mar. 10, 2026

(54) LOW RESISTANCE SEPARATOR DESIGN IN BATTERY CELLS

(71) Applicant: APPLE INC., Cupertino, CA (US)

(72) Inventors: Mikyong Yoo, Palo Alto, CA (US); Soonho Ahn, San Jose, CA (US); Sang Young Yoon, San Jose, CA (US)

(73) Assignee: APPLE INC., Cupertino, CA (US)

( * ) Notice: Subject to any disclaimer, the term of this patent is extended or adjusted under 35 U.S.C. 154(b) by 667 days.

(21) Appl. No.: 17/652,086

(22) Filed: Feb. 22, 2022

(65) Prior Publication Data

US 2022/0336923 A1 Oct. 20, 2022

Related U.S. Application Data

(60) Provisional application No. 63/174,762, filed on Apr. 14, 2021.

(51) Int. Cl.
*H01M 50/434* (2021.01)
*H01M 50/443* (2021.01)
*H01M 50/449* (2021.01)

(52) U.S. Cl.
CPC ....... *H01M 50/434* (2021.01); *H01M 50/443* (2021.01); *H01M 50/449* (2021.01)

(58) Field of Classification Search
CPC .................................................. H01M 50/434
See application file for complete search history.

(56) References Cited

U.S. PATENT DOCUMENTS

| | | | |
|---|---|---|---|
| 2008/0102361 A1 | 5/2008 | Lee et al. | |
| 2013/0143091 A1* | 6/2013 | Ueki ..................... | H01M 4/626 |
| | | | 429/246 |
| 2013/0183568 A1 | 7/2013 | Babinec et al. | |
| 2019/0312300 A1 | 10/2019 | Ma et al. | |

FOREIGN PATENT DOCUMENTS

| | | |
|---|---|---|
| CN | 102449809 A | 5/2012 |
| CN | 104269509 A | 1/2015 |
| CN | 109755634 A | 5/2019 |
| CN | 110859053 A | 3/2020 |

(Continued)

OTHER PUBLICATIONS

"Notification of the First Office Action," mailed Dec. 21, 2023 in Chinese Application No. CN202210335274.0. 20 pages. Includes English translation.

(Continued)

*Primary Examiner* — Stephan J Essex
(74) *Attorney, Agent, or Firm* — Kilpatrick Townsend & Stockton LLP

(57) ABSTRACT
A battery component is described that has at least one ceramic layer that includes ceramic particles and a binder. The ceramic particles may include α-alumina or γ-alumina. The ceramic layer may be characterized by a porosity of greater than or about 40 vol %. In additional embodiments, the one or more ceramic layers may have a weight ratio of ceramic particles to binder is greater than or about 90:10. The battery component may be a battery separator that is characterized by a MacMullin number of less than or about 40 and a thermal shrinkage of less than or about 1 vol % after 1 hour at 140° C.

18 Claims, 7 Drawing Sheets

(56)  References Cited

FOREIGN PATENT DOCUMENTS

| CN | 112142453 A | 12/2020 | |
| CN | 112151728 A | 12/2020 | |
| WO | WO-2013187458 A1 * | 12/2013 | .......... H01M 10/058 |

OTHER PUBLICATIONS

Office Action issued in China Application No. CN202210335274.0, dated Aug. 20, 2024 in 20 pages.
Office Action issued in China Application No. CN202210335274.0, dated Nov. 2, 2024 in 16 pages.

* cited by examiner

LOW RESISTANCE SEPARATOR DESIGN IN BATTERY CELLS

CROSS-REFERENCES TO RELATED APPLICATION

This application claims the benefit of U.S. Provisional Application No. 63/174,762, filed Apr. 14, 2021 entitled "Low Resistance Separator Design In Battery Cells," the disclosure which is incorporated by reference herein in its entirety.

TECHNICAL FIELD

The present technology relates to battery components for battery cells. More specifically, the present technology relates to improved battery separator designs for energy storage devices including battery cells.

BACKGROUND

A battery separator permits the transport of ionic charge carriers between a battery's electrodes while keeping them electrically isolated to prevent an electrical short circuit. In a rechargeable battery, the battery separator permits the ionic charge carriers to move back-and-forth between the electrodes during successive charge and discharge cycles. A rechargeable battery that includes a separator with low resistance wastes less energy moving ionic charge carriers through the separator each time the battery is charged and discharged. Thus, a goal of battery separator design is to make a separator with low resistance. This and other goals are addressed in the application.

BRIEF SUMMARY

The present technology includes battery components that include at least one ceramic layer that includes ceramic particles and a binder. In some embodiments, the ceramic particles include α-alumina (α-Al$_2$O$_3$) while in additional embodiments the particles include γ-alumina (γ-Al$_2$O$_3$). The ceramic layer may be characterized by a porosity of greater than or about 40 vol %. The battery component may be characterized by a MacMullin number of less than or about 40.

In additional embodiments, the ceramic layer may include greater than or about 50 wt. % α-alumina ceramic particles. The α-alumina ceramic particles may have a bifurcated distribution of particle sizes that includes a first portion of the α-alumina ceramic particles characterized by a first D50 particle size distribution of greater than or about 0.5 μm, and a second portion of the α-alumina ceramic particles that may be characterized by a second D50 particle size distribution of less than or about 0.4 μm. In further embodiments, the α-alumina-containing ceramic layer may have a density greater than or about 1.5 g/cm³. In still further embodiments, the α-alumina ceramic particles may be characterized by a mean pore size of less than or about 0.2 μm. In additional embodiments, the first and the second portions of the α-alumina ceramic particles have a weight ratio range of 70:30 to 30:70. In yet additional embodiments, the ceramic layer comprises greater than or about 50 wt. % γ-alumina ceramic particles. In more embodiments, the γ-alumina ceramic particles may be characterized by a D50 particle size distribution of less than or about 0.3 μm. In still more embodiments, the γ-alumina-containing ceramic layer may have a density less than or about 0.5 g/cm³. In still further embodiments, the γ-alumina ceramic particles may be characterized by a mean pore size of less than or about 0.05 μm. In more embodiments, the γ-alumina-containing ceramic layer may be characterized by a hydrogen fluoride gas absorption capacity of greater than or about 5 mg HF per gram of the ceramic layer. In still more embodiments, the battery component is a battery separator incorporated into a battery, where the battery may be characterized by a capacity retention of greater than or about 90% after 300 charge-discharge cycles. In still further embodiments, the battery component may be a battery separator characterized by a MacMullin number of less than or about 40.

The present technology also includes battery separators that include at least one ceramic layer that includes ceramic particles and a binder. The ceramic particles may include α-alumina or γ-alumina. The ceramic layer may include a weight ratio of the ceramic particles to the binder that is greater than or about 90:10. The battery separator may be characterized by a thermal shrinkage of less than or about 1 vol. % after 1 hour at 140° C.

In additional embodiments, the binder in the ceramic layer may be characterized by a glass transition temperature (T$_g$) of greater than or about 80° C. In further embodiments, the binder in the ceramic layer of the battery separator may be selected from polyvinyl pyrrolidone, polyvinyl alcohol, and polyacrylate. In yet further embodiments, the binder may further include a dispersant. In more embodiments, the ceramic layer may include greater than or about 90 wt. % γ-alumina ceramic particles or greater than or about 90 wt. % α-alumina ceramic particles. In still additional embodiments, the battery separator may have a porosity of greater than or about 40 vol. %.

The present technology further includes methods of making battery separators. The methods may include combining ceramic particles and a binder composition into a ceramic slurry. The ceramic particles may include α-alumina or γ-alumina, and when the particles are combined with the binder composition they may form a ceramic slurry having a viscosity of less than or about 1000 cP at 25° C. The methods may further include forming the ceramic slurry into a green-body ceramic layer, and curing the green-body ceramic layer to form a cured ceramic layer.

In additional embodiments, the binder composition used in the methods may include water and a binder selected from polyvinyl pyrrolidone, polyvinyl alcohol, and polyacrylate. In further embodiments, the green-body ceramic layer may be formed on a base layer made of an organic polymer that is part of the battery separator. In still additional embodiments, the green-body ceramic layer may be formed on an electrode of a battery. In yet further embodiments, the cured ceramic layer may include greater than or about 90 wt. % γ-alumina ceramic particles or greater than or about 90 wt. % α-alumina ceramic particles. In still additional embodiments, the cured ceramic layer may be characterized by a porosity of greater than or about 40 vol %. In more embodiments, the battery separator made by the present methods may be characterized by a thermal shrinkage of less than or about 1 vol. % after 1 hour at 140° C., and a MacMullin number of less than or about 40.

The present technology may provide numerous benefits over conventional battery components. For example, embodiments of the present battery separators made with high weight ratios of fine-grained, α-alumina or γ-alumina ceramic particles relative to the binder have a lower resistance than conventional separators made with multiple phases of alumina ceramic particles and larger portions of binder. In embodiments, the present battery separators achieve these lower resistances while also having higher thermal stability and capacity retention over hundreds of charge-discharge cycles during the lifetime of the battery. Embodiments of the present battery separators further improve battery performance over an extended lifetime with an increased absorption capacity for corrosive hydrogen fluoride generated by fluorine-containing electrode active materials such as $LiPF_6$. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
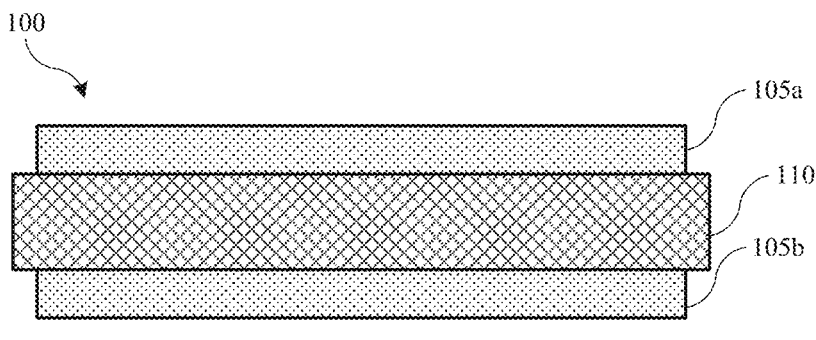
FIG. 1 shows a simplified schematic of a battery component according to present embodiments.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The present technology addresses problems with conventional rechargeable battery cell technology being able to efficiently and consistently store and deliver electrical energy over a long lifetime. In conventional rechargeable battery cells, efficient storage and delivery of electrical power is hampered by a high resistance in one or more of the battery cell's components through which ionic charge carriers and electric current passes. The high resistance requires more energy to be expended to move the carriers and current through the battery cell, which in turn reduces the cell's efficiency in accepting and storing energy from an external source, and delivering its stored energy to an external load. In most instances, the additional energy required to move the carriers and current through a high resistance battery components generates heat that can cause a rapidly charging-and-discharging battery to overheat. In some instances, the overheating can result in a temporary or permanent battery cell shut down.

Conventional rechargeable battery cells are also hampered in their ability to consistently store and deliver electrical energy over the cell's lifetime by the steady degradation of the battery cell's components. This degradation can occur in the battery separator among other battery components. Degradation of the battery separator can include clogging, constricting, and blocking of pores and channels for transporting ionic charge carriers through the separator. This can result in a further increase in the separator's resistance and a successive reduction in the battery cell's capacity with every additional charge-discharge cycle. Degradation of the battery separator can also include the warping and shrinkage of the separator as a result of thermal instability. When a high-resistance separator experiences high operating temperatures during active periods of charging-and-discharging, the materials in the separator, organic polymer materials in particular, can undergo extensive warping and shrinkage. In many instances, the pores and channels for transporting the ionic charge carriers through the separator become constricted or close entirely, further increasing the separator's resistance. In further instances, the deformation of the separator can result in cracks and tears permit dendrites to form between the active electrode materials to create an electrical short in the battery cell. These and other stresses on the battery separator reduce the battery cell's ability to consistently store and deliver electrical power with each charge-discharge cycle over the battery cell's lifetime.

The present technology includes battery components that, among other benefits, address the problems above with the inability of conventional battery components to permit a battery cell to efficiently and consistently store and deliver electrical energy over a long lifetime. In embodiments, the present technology includes battery components such as a battery separator that has a ceramic layer which is characterized by a lower resistance, higher thermal stability, and higher capacity retention than a conventional battery separator that lacks the ceramic layer. In further embodiments, the ceramic layer may include $\alpha$-alumina particles bound with a binder that gives the layer a combined density and porosity that is greater than conventional battery separators. The high density contributes to the uniformity of the ceramic layer as well as its thermal and structural stability over many battery cell charge-discharge cycles. The high porosity of the ceramic layer contributes to a lower resistance of the battery separator by reducing the energy barrier to transporting ionic charge carriers through the layer. In still further embodiments, the ceramic layer may include $\gamma$-alumina particles bound with a binder that may be characterized by a porosity, surface area, and uniformity that are greater than conventional battery separators. The high porosity and uniformity of the $\gamma$-alumina-containing ceramic layers lower the battery separator's resistance without lowering its thermal and structural stability over many battery cell charge-discharge cycles. The low density of the $\gamma$-alumina particles provide can provide a low-density ceramic layer with low resistance and increased thermal and structural stability.

In additional embodiments, the weight ratio of the $\alpha$-alumina or $\gamma$-alumina ceramic particles to the binder in the ceramic layer is greater than or about 90:10 (e.g., greater than or about 90 wt. % ceramic particles based on a total weight of the ceramic layer). In further embodiments, the binder may have a glass transition temperature ($T_g$) of greater than or about 80° C. The greater levels of thermally-stable ceramic particles and high glass transition temperature of the binder contribute to the increased thermal stability of the ceramic layer and battery separator. In embodiments, the present battery separators may be characterized by less than or about 1 vol. % of thermal shrinkage after experiencing 140° C. temperatures for one hour. In contrast, some conventional battery separators showed between 5-20 vol. % thermal shrinkage under the same temperature conditions.

In further embodiments, the high-stability ceramic layers contributed to the battery cell retaining more initial charge-discharge capacity over an increased number of charge-discharge cycles. In embodiments, battery cells containing battery separators that include one or more of the ceramic layers may be characterized by retention capacities of greater than or about 90% of their initial capacity after 300 charge-discharge cycles. In contrast, comparative battery cells with battery separators made with conventional ceramic layers can lose more than 10% of their initial capacity after the same number of cycles. In further embodiments, the battery cells containing battery separators that included at least one of the present ceramic layers also retained more capacity and increased charge-discharge rates (i.e., C-rates). The battery cells may be characterized by capacity retention that is greater than or about 95% at a discharge C-rate of 1, and greater than or about 80% at a C-rate of 2.

Embodiments of the present technology provides additional benefits, including an increased ability of the battery component to scavenge corrosive compounds like hydrogen fluoride in the battery cell's electrolyte. In embodiments, ceramic layers made of small-sized, $\gamma$-alumina ceramic particles may be characterized by a hydrogen fluoride absorption capacity of greater than or about 5 mg HF per gram of the ceramic layer. This is more than four times the HF absorption capacity of a conventional battery separator, and reduces the corrosive effects of the HF on the battery cell's components and electrolyte.

Figure 2:
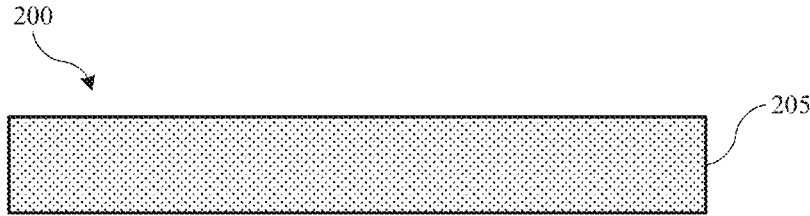
FIG. 2 shows a simplified schematic of a battery separator according to present embodiments.
Figure 3:
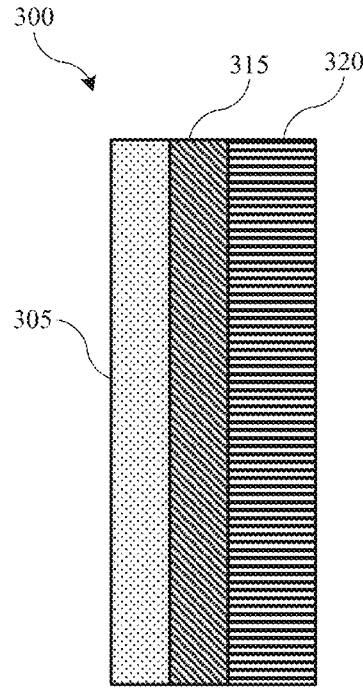
FIG. 3 shows a simplified schematic of a battery component that includes a battery separator coated on a battery electrode according to present embodiments.

FIGS. 1-3 show a cross-sectional views of embodiments of a battery components according to the present technology. FIG. 1 shows battery component 100 which includes a combination of ceramic layers 105a-b and a base layer 110. FIG. 2 shows an embodiment of the present battery components in the form of a battery separator 200 that is made of a single ceramic layer 205. FIG. 3 shows a battery component 300 that includes a ceramic layer 305 formed on an electrode active material 315 of a battery electrode that also includes current collector 320. The embodiments of the battery components shown in FIGS. 1-3 all include at least one ceramic layer with an improved design according to the present technology. Additional details about embodiments of the design are given below with a focus on ceramic layers 105a-b in in FIG. 1. These details also apply to ceramic layer 205 in FIG. 2, and ceramic layer 305 in FIG. 3.

Referring to FIG. 1, battery component 100 includes ceramic layers 105a-b formed on a base layer 110. In embodiments, the ceramic layers 105a-b may include ceramic particles of $\alpha$-alumina or $\gamma$-alumina that are bound together by an organic polymer binder. In additional embodiments, one or both of the ceramic layers 105a-b may include a percentage of $\alpha$-alumina ceramic particles (based on the total weight of ceramic particles) in an amount greater than or about 50 wt. %, greater than or about 60 wt. %, greater than or about 70 wt. %, greater than or about 80 wt. %, greater than or about 90 wt. %, greater than or about 92 wt. %, greater than or about 95 wt. %, greater than or about 98 wt. %, greater than or about 99 wt. %, or more. In further embodiments, substantially all the ceramic particles in the ceramic layers 105a-b are $\alpha$-alumina ceramic particles.

In some embodiments, the $\alpha$-alumina ceramic particles may have a D50 particle size distribution of less than or about 1 $\mu$m, less than or about 0.9 $\mu$m, less than or about 0.8 $\mu$m, less than or about 0.7 $\mu$m, less than or about 0.6 $\mu$m, less than or about 0.5 $\mu$m, less than or about 0.4 $\mu$m, less than or about 0.3 $\mu$m, less than or about 0.2 $\mu$m, less than or about 0.1 $\mu$m, or less. In additional embodiments, the $\alpha$-alumina ceramic particles may have a bimodal D50 particle size distribution with a first portion of the $\alpha$-alumina ceramic particles being characterized by a first D5 particle size distribution that is larger than a second D50 particle size distribution for a second portion of the $\alpha$-alumina ceramic particles, and where the first and second portions make up all the $\alpha$-alumina ceramic particles in one or both of the ceramic layers 105a-b. In further embodiments, a weight ratio of the first portion to the second portion of $\alpha$-alumina ceramic particles may be less than or about 95:5, less than or about 90:10, less than or about 80:20, less than or about 70:30, less than or about 60:40, or less. In yet further embodiments, the weight ratio of the first portion to the second portion of $\alpha$-alumina ceramic particles may be greater than or about 5:95, greater than or about 10:90, greater than or about 20:80, greater than or about 30:70, greater than or about 40:60, or more. In still additional embodiments, the weight ratio of the first portion to the second portion of $\alpha$-alumina ceramic particles may be about 50:50. In embodiments, the first D50 particle size distribution may be greater than or about 0.5 $\mu$m, greater than or about 0.6 $\mu$m, greater than or about 0.7 $\mu$m, greater than or about 0.8 $\mu$m, greater than or about 0.9 $\mu$m, greater than or about 1 $\mu$m, or more. In further embodiments, the second D50 particle size distribution may be less than 0.5 $\mu$m, less than or about 0.4 $\mu$m, less than or about 0.3 $\mu$m, less than or about 0.2 $\mu$m, less than or about 0.1 $\mu$m, or less.

In embodiments, a bimodal distribution of the D50 particle sizes of the $\alpha$-alumina ceramic particles may increase the density of the ceramic layers 105a-b without reducing their high levels of porosity. In addition, the bimodal distribution may keep the mean pore size in the ceramic layers 105a-b small while increasing their porosity. As a result, embodiments of the ceramic layers 105a-b with the above-described bimodal distributions of D50 particle sizes for the $\alpha$-alumina ceramic particles have higher conductivity (i.e., lower resistance) of ionic charge carriers (e.g., $Li^+$ ions) moving through the layers. This may be accomplished without reducing the density of the layers 105a-b, which can reduce the mechanical and thermal stability of the layers. The increase in porosity may also be accomplished without increasing the mean pore size in the ceramic layers 105a-b, which can increase the probability that a dendrite of active electrode material can penetrate the battery separator and create an electrical short between the battery cell's electrodes.

In additional embodiments, one or both of the ceramic layers 105a-b may include a percentage of γ-alumina ceramic particles (based on the total weight of ceramic particles) in an amount greater than or about 50 wt. %, greater than or about 60 wt. %, greater than or about 70 wt. %, greater than or about 80 wt. %, greater than or about 90 wt. %, greater than or about 92 wt. %, greater than or about 95 wt. %, greater than or about 98 wt. %, greater than or about 99 wt. %, or more. In further embodiments, substantially all the ceramic particles in the ceramic layers 105a-b are γ-alumina ceramic particles. In embodiments, the γ-alumina ceramic particles may be characterized by small D50 particle sizes and high BET surface areas. In additional embodiments, the γ-alumina ceramic particles may have a D50 particle size of less than or about 0.3 μm, less than or about 0.2 μm, less than or about 0.1 μm, less than or about 0.05 μm, or less. In yet further embodiments, the γ-alumina ceramic particles may be characterized by a BET surface area of greater than or about 50 m$^2$/g, greater than or about 60 m$^2$/g, greater than or about 70 m$^2$/g, greater than or about 80 m$^2$/g, greater than or about 90 m$^2$/g, greater than or about 100 m$^2$/g, greater than or about 110 m$^2$/g, greater than or about 120 m$^2$/g, greater than or about 130 m$^2$/g, greater than or about 140 m$^2$/g, greater than or about 150 m$^2$/g, or more. In embodiments, the small D50 particle size of the γ-alumina ceramic particles permit the ceramic layers 105a-b to have a high density and high level of porosity like the layers made with α-alumina ceramic particles. In further embodiments, the high BET surface area of the γ-alumina ceramic particles may give the ceramic layers 105a-b a high capacity to absorb corrosive compounds generated during the charge-discharge cycles of a battery cell like hydrogen fluoride. In embodiments, the ceramic layers 105a-b may be characterized by a hydrogen fluoride absorption capacity of greater than or about 5 mg HF per gram of the ceramic layer, greater than or about 6 mg HF per gram of ceramic layer, greater than or about 7 mg HF per gram of ceramic layer, greater than or about 8 mg HF per gram of ceramic layer, or more.

In some embodiments, the ceramic layers 105a-b may include ceramic particles made of other materials in addition to the α-alumina or γ-alumina. In embodiments, these ceramic particles may include oxides, nitrides, carbides, hydroxide, and titanates, of a number of metals and semiconductors such as barium, strontium, boron, iron, lead, zirconium, magnesium, silicon, aluminum, titanium, yttrium, and zinc, among others. In more embodiments, the ceramic particles may include one or more of aluminum nitride, boron nitride, magnesium hydroxide, silicon nitride, silicon oxynitride, and silicon aluminum oxynitride, among other kinds of ceramic particles. In embodiments, the weight percentage of these non-α-alumina or γ-alumina ceramic particles (based on the total weight of ceramic particles in the ceramic layers 105a-b) may be less than 50 wt. %, less than or about 40 wt. %, less than or about 30 wt. %, less than or about 20 wt. %, less than or about 10 wt. %, less than or about 5 wt. %, less than or about 2.5 wt. %, less than or about 1 wt. %, or less.

In embodiments, the ceramic particles in ceramic layers 105a-b are bound together by an organic polymer binder. A variety of organic polymers may be used as a binder according to the present technology. In additional embodiments, the binder may include one or more organic polymers that are compatible with the ceramic particles and chemically (and electrochemically) stable with electrolytes used in battery cells. In yet additional embodiments, the binder may include one or more polyimides. The polyimides may be linear or include aromatic moieties, and may include semi-aromatic polyimides. In embodiments, the polyimides may also be modified to incorporate additional functional moieties such as carboxylate moieties. In further embodiments, the binder polymers may include polyamides, which may be aliphatic, semi-aromatic, or otherwise include aromatic moieties. In still further embodiments, the binder polymers may include amorphous organic polymers, such as polyamide imides. In additional embodiments, the binder may include one or more polymers selected from polyvinyl pyrrolidone, polyvinyl alcohol, and polyacrylate, among other binder polymers. In still additional embodiments, the binder may include at least one of polyvinylidene difluoride (PVdF) or a polyvinylidene difluoride-co-hexafluoropropylene copolymer (PVdF-HFP).

In additional embodiments, the weight ratio of the ceramic particles to the binder in the ceramic layers 105a-b may be greater than or about 80:20, greater than or about 85:15, greater than or about 90:10, greater than or about 91:9, greater than or about 92:8, greater than or about 93:7, greater than or about 94:6, greater than or about 95:5, greater than or about 96:4, greater than or about 97:3, greater than or about 98:2, greater than or about 99:1, or more. In embodiments, the weight ratio favors the ceramic particles, which undergo less volumetric change with changes in temperature than the binder. The increased weight ratio of ceramic particles to binder results in a lower volumetric change in the ceramic layers 105a-b with a change in temperature.

In further embodiments, the binder may have a glass transition temperature that is higher than room temperature (i.e., 23° C.). In additional embodiments, the binder may have a glass transition temperature higher than the operational temperatures of the battery cell in which the battery component 100 is incorporated. By utilizing binders having a higher glass transition temperature, battery separators according to the present technology are characterized by improved thermal and dimensional stability in embodiments, and are less prone to shrinking over cell lifetime or during abuse conditions, or may shrink to a lesser degree than conventional battery separators that include one or more ceramic layers made with a binder characterized by a lower glass transition temperature. In further embodiments, the binder in ceramic layers 105a-b may further include moieties, co-polymers, and other modifications to increase one or more aspects of the plasticity of the binder such as its flexibility, ductility, and/or malleability. These modifications may be made to reduce cracking and brittleness in the ceramic layers 105a-b that result from the binder having a higher glass transition temperature. In embodiments, the binder in the ceramic layers 105a-b may be characterized by a glass transition temperature (Tg) of greater than or about 80° C., greater than or about 90° C., greater than or about 100° C., greater than or about 110° C., greater than or about 120° C., greater than or about 130° C., greater than or about 140° C., greater than or about 150° C., or more.

The high weight ratio of ceramic particles to binder combined with the high glass transition temperature of the binder may reduce the thermal shrinkage of the ceramic layers 105a-b when they are exposed to high-temperature conditions for an extensive period of time. In embodiments, the ceramic layers 105*a-b* may be characterized by a thermal shrinkage after exposure for 1 hour to a 140° C. temperature environment of less than or about 5 vol. %, less than or about 4 vol. %, less than or about 3 vol. %, less than or about 2 vol. %, less than or about 1 vol. %, or less.

Embodiments of the present technology include α-alumina-containing ceramic layers in battery components such as battery separators that have higher density and higher porosity than conventional battery components. In embodiments, the ceramic layers in FIGS. 1-3 made with α-alumina-containing particles may be characterized by a density of greater than or about 1.5 g/cm³, greater than or about 1.55 g/cm³, greater than or about 1.6 g/cm³, greater than or about 1.65 g/cm³, greater than or about 1.7 g/cm³, greater than or about 1.75 g/cm³, or more. In further embodiments, the ceramic layers 105*a-b* may be characterized by a porosity of greater than or about 40 vol. %, greater than or about 45 vol. %, greater than or about 50 vol. %, greater than or about 55 vol. %, greater than or about 60 vol. %, greater than or about 65 vol. %, greater than or about 70 vol. %, or more. The high density and high porosity of these α-alumina-containing ceramic layers may provide battery separators that are characterized by a lower resistance, higher uniformity of particle and pore sized distributions throughout the ceramic layer, and increased thermal and mechanical stability.

Additional embodiments of the present technology include γ-alumina-containing ceramic layers in battery components such as battery separators that have lower density, lower pore sizes, and higher porosity than conventional battery components. In embodiments, the ceramic layers in FIGS. 1-3 made with γ-alumina-containing particles may be characterized by a density of less than or about 1.0 g/cm³, less than or about 0.9 g/cm³, less than or about 0.8 g/cm³, less than or about 0.7 g/cm³, less than or about 0.6 g/cm³, less than or about 0.5 g/cm³, less than or about 0.4 g/cm³, less than or about 0.3 g/cm³, less than or about 0.2 g/cm³, less than or about 0.1 g/cm³, or less. In yet further embodiments, the γ-alumina-containing ceramic layers 105*a-b* may be characterized by a mean pore size of less than or about 0.5 μm, less than or about 0.4 μm, less than or about 0.3 μm, less than or about 0.2 μm, less than or about 0.1 μm, less than or about 0.05 μm, less than or about 0.025 μm, less than or about 0.01 μm, or less. The low density and high porosity of these γ-alumina-containing ceramic layers may provide lower-weight battery separators that are characterized by a lower resistance and higher uniformity of particle and pore size distributions throughout the ceramic layer.

The increased mechanical strength of the ceramic layers permits the layers to have a reduced thickness relative to ceramic layers in conventional battery separators. For example, ceramic layers in many conventional separators are limited to thicknesses of greater than or about 20 μm. In embodiments, the present technology permits entire separators like the one shown in battery component 100 to be characterized by a total thickness of less than or about 30 μm in thickness, less than or about 25 μm, less than or about 20 μm, less than or about 18 μm, less than or about 16 μm, less than or about 15 μm, less than or about 14 μm, less than or about 13 μm, less than or about 12 μm, less than or about 11 μm, less than or about 10 μm, less than or about 9 μm, less than or about 8 μm, less than or about 7 μm, less than or about 6 μm, less than or about 5 μm, less than or about 4 μm, less than or about 3 μm, less than or about 2 μm, less than or about 1 μm, or less. Additionally, by forming the ceramic layers directly over electrode materials or current collectors as shown in FIG. 3, the battery separators according to embodiments of the present technology may be wound into rolls of materials that may be later processed into particular cell form factors and configurations. In contrast, when conventional battery separators are formed over a liner, the thickness is often limited to a minimum above a few dozen micrometers to allow adequate handling of the produced separator. Once the liner is removed, the separator is then placed in a battery cell. The present technology is not limited in this respect, because the ceramic layer may be formed directly over the electrode active material, which may also provide the benefit of allowing the composite product to be wound during fabrication.

In further embodiments, the ceramic layers in FIGS. 1-3 may also be characterized by an air permeability measurement that correlates to the rate and resistance of ionic charge carriers moving through the layers. The air permeability of the ceramic layers may also be correlated with the density, porosity, and thickness of the layer. In embodiments, the air permeability may be measured as the time to pass a given volume of air across the ceramic layer. In additional embodiments, the ceramic layers may be characterized by an air permeability greater than or about 50 seconds/100 cc of air, greater than or about 100 seconds/100 cc of air, greater than or about 150 seconds/100 cc of air, greater than or about 200 seconds/100 cc of air, greater than or about 250 seconds/100 cc of air, greater than or about 300 seconds/100 cc of air, greater than or about 350 seconds/100 cc of air, greater than or about 400 seconds/100 cc of air, or more.

FIGS. 1-3 each show a different embodiment of a battery component that includes at least one ceramic layer according to embodiments of the present technology. The embodiment of battery component 100 shown in FIG. 1, ceramic layers 105*a-b* are in contact with opposite facing sides of a base layer 110. In embodiments, the base layer 110 may be a microporous polymer membrane or a non-woven fabric mat that is suitable for battery cells. Exemplary base layer materials include organic polymers such as polyethylene (PE), polypropylene (PP), polyamide (PA), polytetrafluoroethylene (PTFE), polyvinyl chloride (PVC), polyester, polyvinylidene difluoride (PVdF), and combinations of two or more of these polymers. In embodiments, the base layer may have a thickness less than or about 20 μm, less than or about 17.5 μm, less than or about 15 μm, less than or about 12.5 μm, less than or about 10 μm, less than or about 7.5 μm, less than or about 5 μm, or less.

The embodiment of the battery component shown in FIG. 2 is a single-layer battery separator 200 made of a ceramic layer 205. In this embodiment, the battery separator 200 lacks a base layer and the only organic polymer in the separator comes from the binder in ceramic layer 205. In further embodiments, these compact, base-layer-free battery separators may be thermally stable at temperatures that are significantly higher than conventional battery separators that include a solid organic polymer base layer. In embodiments, the battery separator 200 may experience less than 1 vol. % shrinkage after one hour of exposure to temperatures up to or about 140° C., up to or about 150° C., up to or about 160° C., up to or about 170° C., up to or about 180° C., up to or about 190° C., up to or about 200° C., up to or about 210° C., up to or about 220° C., up to or about 230° C., up to or about 240° C., up to or about 250° C., or more.

In additional embodiments, the lack of a solid organic polymer base layer in battery separator 200 may increase the thermal conductivity of the separator. In embodiments, the battery separator 200 may have a 25° C. thermal conductivity that is greater than or about 1 W/mK, greater than or about 2 W/mK, greater than or about 3 W/mK, greater than or about 4 W/mK, greater than or about 5 W/mK, or more.

The increased thermal stability and thermal conductivity of battery separator 200, combined with its increase flame resistance, may significantly improve the safety of battery cells that incorporate battery separator 200.

The embodiment of the battery component shown in FIG. 3 is a single-ceramic layer 305 formed on an electrode of a battery cell. As shown in FIG. 3, a portion of an electrode is shown that includes the electrode active material layer 315 on which the ceramic layer 305 is formed, and current collector layer 320 on which the electrode active material is formed. As will be discussed more in the methods of making the battery components below, a ceramic slurry that includes ceramic particles and binder composition may be coated the electrode active material 315 and cured to form the ceramic layer 305. The ceramic layer 305 does not contact an organic polymer base layer, and may have thermal stability characteristics similar to those of ceramic layer 205 in battery separator 200. The ceramic layer 305 may also be applied as a thin layer on the electrode active material 315. In embodiment, the ceramic layer 305 may be characterized by a thickness of less than or about 10 μm, less than or about 5 μm, less than or about 4 μm, less than or about 3 μm, less than or about 1 μm, less than or about 1 μm, or less.

The thinness of the ceramic layer 305 and lack of a base layer, combined with the high porosity of the layer among other characteristics, may provide a layer with a low resistance to the conductivity of ionic charge carriers through the layer. This resistance may be measured by measuring a MacMullin number for the battery separator 300 that includes the ceramic layer 305. In embodiments the battery separator may be characterized by a MacMullin number of less than or about 50, less than or about 45, less than or about 40, less than or about 39, less than or about 38, less than or about 37, less than or about 36, less than or about 35, less than or about 34, less than or about 33, less than or about 32, less than or about 31, less than or about 30, or less. It should be appreciated that similar ranges for a MacMullin number may characterize ceramic layers in battery component 100, battery separator 200, and other embodiments of the present technology.

Figure 4:
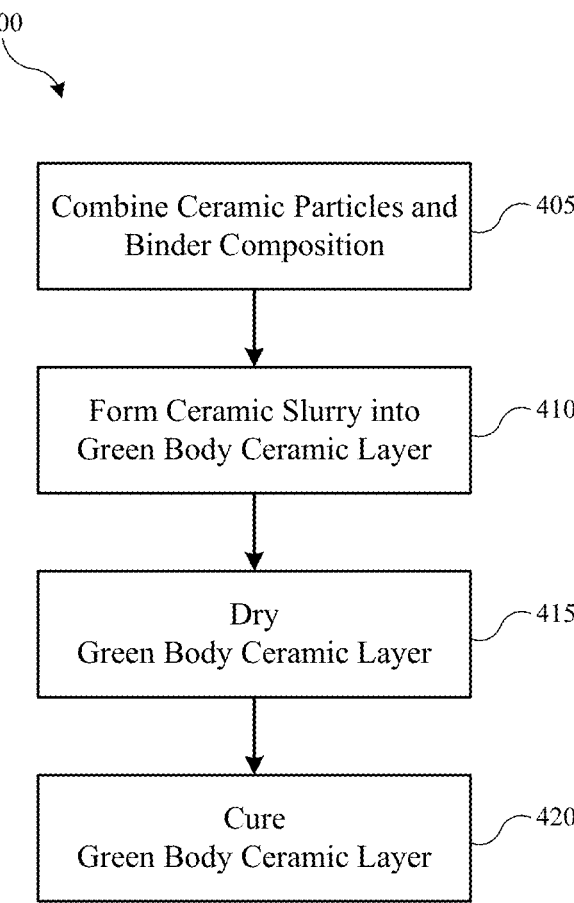
FIG. 4 shows a simplified flowchart of a method of making a battery component according to present embodiments.

FIG. 4 shows a flowchart with selected operations in a method 400 of making battery components according to embodiments of the present technology. Method 400 may include combining ceramic particles and a binder composition to make a ceramic slurry at operation 405. The ceramic particles may be the above-described α-alumina or γ-alumina ceramic particles found in embodiments of the ceramic layers according to the present technology. In additional embodiments the binder composition may include water and a binder. In further embodiments, the binder composition may also optionally include one or more of a dispersant, a defoamer, a curing agent, or a wetting agent. In embodiments, the binder may include one or more of a pre-polymer or partially polymerized polymer of an organic polymer. In further embodiments, the organic polymer include one or more types of polymer such as polyimides, polyamides, polyvinyl pyrrolidone, polyvinyl alcohol, polyacrylate, polyvinylidene difluoride and polyvinylidene difluoride-co-hexafluoropropylene copolymer, among other types of polymer. In embodiments, the dispersant may include at least one of anionic dispersant or a cationic dispersant. In further embodiments, the dispersant may include a polyacrylate salt such as sodium polyacrylate.

In embodiments, combining the ceramic particles and binder composition at operation 405 may include mixing dry ceramic particles in an aqueous binder composition that includes water and a pre-polymerized mixture of binder reactants such as binder monomers and oligomers. In further embodiments, combining the ceramic particles and binder composition may include mixing dry ceramic particles in a dissolved polymer binder composition. In still further embodiments, the ceramic particles may be combined with a dissolved polymer binder composition to produce a phase-inverted ceramic-polymer green-body ceramic layer. In embodiments, the dissolved polymer binder composition may include a PVdF-containing polymer (e.g., a PVdF-HFP polymer) dissolved in a polar-organic solvent (e.g., dimethylformamide, dimethyl sulfoxide, N-methylpyrrolidone, dimethylacetamide, among other polar-organic solvents). In further embodiments, the combined mixture of the ceramic particles and the dissolved-polymer binder composition forms a ceramic slurry that can be used to make a phase-inverted ceramic/polymer layer (e.g., a phase-inverted ceramic/PVdF layer).

In embodiments, the binder composition may be characterized by a weight percentage of total solids less than or about 50 wt. %, less than or about 45 wt. %, less than or about 40 wt. %, less than or about 35 wt. %, less than or about 30 wt. %, less than or about 25 wt. %, less than or about 20 wt. %, less than or about 15 wt. %, less than or about 10 wt. %, or less. In additional embodiments, the total solids level in the binder composition may depend on the type of alumina particles included in the ceramic slurry. In embodiments, the binder composition may have a total solid level of less than or about 15 wt. % when the ceramic particles include γ-alumina. In additional embodiments, the binder composition may have a total solid level of greater than or about 40 wt. % when the ceramic particles include α-alumina.

In additional embodiments, the weight ratio of the binder to the dispersant may maintain a homogeneously dispersed slurry of the ceramic particles during the formation of the green-body ceramic layer. In embodiments, the weight ratio of binder to dispersant may be greater than or about 10:0.1, greater than or about 10:0.5, greater than or about 10:0.75, greater than or about 10:1, greater than or about 10:1.25, greater than or about 10:1.5, greater than or about 10:1.75, greater than or about 10:2, or more.

In still further embodiments, the slurry viscosity may be low enough to form a thin layer of the slurry on a substrate of the battery component such as a base layer or electrode. In additional embodiments the 25° C. slurry viscosity may be less than or about 1000 cP, less than or about 900 cP, less than or about 800 cP, less than or about 700 cP, less than or about 600 cP, less than or about 500 cP, less than or about 400 cP, less than or about 300 cP, less than or about 200 cP, less than or about 100 cP, less than or about 50 cP, or less. In yet further embodiments the slurry viscosity should be high enough to approximate maintain the dimensions of the green-body ceramic layer until it is cured into the final ceramic layer. In embodiments, the 25° C. slurry viscosity may be greater than 1 cP, greater than 5 cP, greater than 10 cP, greater than 25 cP, greater than 35 cP, greater than or about 50 cP.

Method 400 may also include forming the above-described ceramic slurry into a green-body ceramic layer at operation 410. In embodiments, the ceramic slurry may be coated onto a substrate of a battery component such as a base layer or an electrode surface (e.g., a surface of an electrode active material). In additional embodiments, the ceramic slurry may be coated on a temporary or sacrificial substrate (e.g., a foil or paper) that is removed from the ceramic layer after the green body is cured. In yet additional embodiments, the ceramic slurry may be supplied to fabrication equipment to incorporate a green-body ceramic layer on a substrate that is fabricated into a battery component. In embodiments, the fabrication operation may include depositing the ceramic slurry on a base layer or part of a battery electrode (e.g., a surface of an electrode active material). The ceramic slurry may be deposited on the substrate and formed into the green-body ceramic layer in any number of ways including by gravure coating, slot die coating, doctor blade coating, or other coating techniques that may provide a complete and uniform coverage across the substrate surface.

Method 400 may further include drying the green-body ceramic layer at operation 415. In embodiments, the drying operation removes at least a portion of the solvents (e.g., water) in the green-body ceramic layer. In further embodiments, the drying operation 415 may involve the flow of a dry gas (e.g., dry nitrogen, dry air) across or through the green-body ceramic layer to carry away evaporated solvent. In yet further embodiments, the drying gas may be at an elevated temperature to accelerate solvent evaporation. In embodiments, the drying gas may be characterized by a temperature of greater than or about 30° C., greater than or about 40° C., greater than or about 50° C., greater than or about 60° C., greater than or about 70° C., greater than or about 80° C., greater than or about 90° C., greater than or about 100° C., or more. In further embodiments, the drying temperature may be set to accelerate the evaporation of solvent without polymerizing unpolymerized or semi-polymerized compounds in the binder. In other embodiments, the drying temperature may be set to both accelerate solvent evaporation and polymerize (or otherwise cure) the green-body ceramic layer. In additional embodiments, the drying operation 415 may occur in fabrication equipment where the green-body ceramic layer was formed. The drying process in these fabrication operations may include adjusting the flow rate and temperature of a drying gas, as wells as the path length and speed through which the green-body layer passes through a drying unit in the fabrication equipment.

Method 400 may yet also include curing the green-body ceramic layer into a cured ceramic layer at operation 420. In some embodiments, the curing operation is performed on a dried green-body ceramic layer, while in additional embodiments the curing operation is performed on an undried, wet green-body ceramic layer that has not undergone a drying operation. In embodiments, the curing operation may polymerize the unpolymerized or partially polymerized polymer reactants (e.g., monomers and oligomers) into the fully-polymerized binder polymer. In additional embodiment, the curing operation 420 includes exposing the green-body ceramic layer to an energy source that affect the cure. Embodiments of energy sources may include thermal heat sources (e.g., ovens, heat lamps, etc.), ultra-violet light sources, and e-beam sources, among other energy sources. In embodiments, the curing operation 420 may occur in fabrication equipment where the green-body ceramic layer was formed. In further embodiments, the fabrication equipment may be designed to perform tandem operations of forming, drying, and curing a green-body ceramic layer as the layer is conveyed through the fabrication equipment. Tandem operations can reduce delays and between operations compared to methods where the green-body is formed, dried and treated in separate areas or on separate pieces of fabrication equipment.

Figure 5:
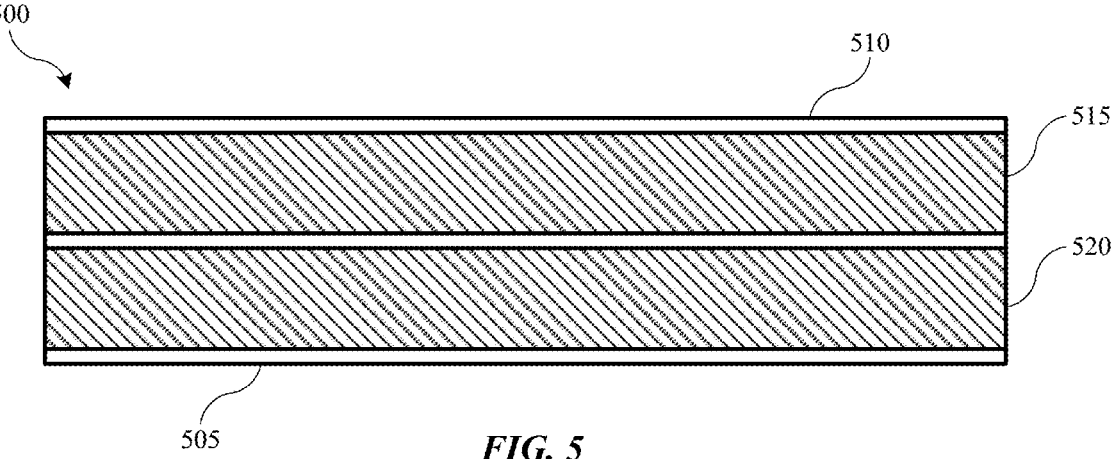
FIG. 5 shows a simplified schematic cross-sectional view of an energy storage device that includes one or more of the present battery components according to embodiments of the present technology.

FIG. 5 shows a cross-sectional view of an energy storage device 500 that includes one or more battery components (e.g., a battery separator 525) according to embodiments of the present technology. Embodiments of the storage device 500 include a battery cell, and a group of battery cells assembled into a battery, among other kinds of energy storage devices. In embodiments, the energy storage device 500 may include a first current collector 505 and a second current collector 510, one of which may be the anode, and the other the cathode side of the energy storage device. Current collectors 505 and 510 may be made of any known collector materials, such as aluminum, copper, nickel, stainless steel, or a variety of other materials that may be capable of operating at cathode and anode potentials within the cell environment.

In additional embodiments, energy storage device 500 may include electrode active material 515 disposed on current collector 510, and electrode active material 520 disposed on current collector 505. Again, either of electrode active materials 515, 520 may be the anode or cathode materials in exemplary designs. In some examples, electrode active material 515 may be an anode material and includes a carbon-containing compound such as graphite or a lithium-containing compound such as lithium titanate. Any other anode materials may similarly be used with the present technology. Additionally, for example, electrode active material 520 is a cathode material including a lithium-containing material such as lithium cobalt oxide or lithium phosphate, among other known lithium compounds used in such devices. The electrode active material 520 may also include nickel, manganese, cobalt, aluminum, and a variety of other materials that would be understood to be encompassed by the present technology. Indeed, any possible anode and cathode materials that may be utilized in batteries including the present battery components as will be described below are suitable for the present designs, and will be understood to be encompassed by the present technology. Battery separator 525 is disposed between the electrode active materials 515, 520.

Figure 6:
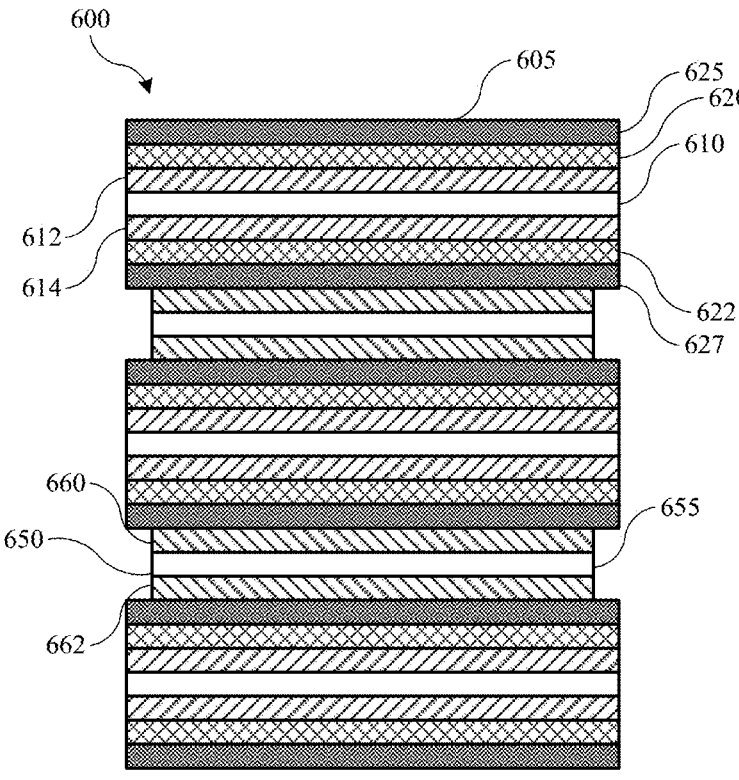
FIG. 6 shows a simplified schematic cross-sectional view of a stacked battery that includes the present battery components according to embodiments of the present technology.

FIG. 6 illustrates a schematic cross-sectional view of a stacked battery 600 according to embodiments of the present technology. Stacked battery 600 may include multiple electrodes including anode electrodes 605 and cathode electrodes 650, and may further include one or more of the battery components according to the present technology. In the embodiment illustrated, battery separators are formed along the anode active materials, although this is not intended to be limiting to where the battery separators may be positioned in a stacked battery design. For example, in many battery cell designs in which a graphite material is utilized within the anode, the anode may be characterized by a larger size than the corresponding lithium-containing cathode material in order to match the operating functionality of the electrodes. Accordingly, because the anode may be larger than the cathode in some embodiments, the separator may be formed along the anode to provide complete coverage between the active materials of the two electrodes. It is to be understood that in other embodiments of the ceramic layer of the battery separator may be formed over the cathode active material.

As illustrated, anode electrodes 605 may include an anode current collector 610, which may be copper or any of the previously noted materials. On opposing surfaces, an anode active material 612, 614 may be formed. It is to be understood that other cell designs are similarly encompassed by the present technology, such as wound battery cells, in which the active material, as well as the separator materials, may be formed on both current collector surfaces or on only one surface of the current collector. A first layer of the battery separators 620, 622 may be formed across each of the respective anode active material layers 612, 614 as will be described below. A second group of battery separators 625, 627 may be formed over each of the respective first separator layers 620, 622.

Cathode electrodes 650 may include a cathode current collector 655, which may be aluminum or any other material that may operate as a cathode current collector. On opposing surfaces of the cathode current collector 655 may be cathode active material 660, 662. The anode electrodes 605 and the cathode electrodes 650 may then be stacked in alternating layers as illustrated to produce a stacked battery 600. The second layer of the battery separators 625, 627 may couple the anode electrodes 605 with the cathode electrodes 650. In this way, the first layer of the battery separators 620, 622 may be positioned adjacent or in contact with the anode active materials, 612, 614, while the second layer of the separators 625, 627 may be positioned adjacent or in contact with the cathode active materials 660, 662. When the separators are formed on the cathode electrodes, it is to be understood that the individual separator layers may be in contact with the alternate active materials.

Figure 7:
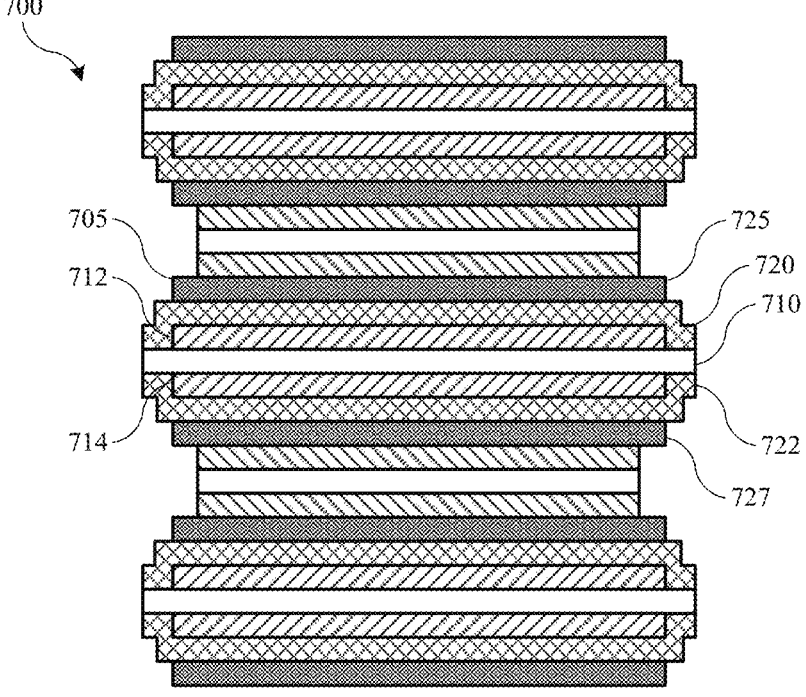
FIG. 7 shows a simplified schematic cross-sectional view of a stacked battery that includes the present battery components according to additional embodiments of the present technology.

FIG. 7 shows a schematic cross-sectional view of a stacked battery 700 according to embodiments of the present technology. Stacked battery 700 may include a battery similar to stacked battery 600, and may include similar materials as noted above. Stacked battery 700 may illustrate an alternative arrangement of the layers of the separators, which may extend beyond the lateral dimensions of the electrode active materials, and may at least partially contact one or more of the current collectors. Again, stacked battery 700 illustrates the separators formed over the anode electrodes 705, although it is to be understood that the separators may be formed over the cathode electrodes in other embodiments. As illustrated, the first layer of the separators 720, 722 may extend beyond one or both lateral edges of anode active material 712, 714. The first layer of the separators 720, 722 may contact current collector 710 on both opposing surfaces of the current collector. Such a configuration may further limit the possibility of contact between the active materials or current collectors that may cause shorting within the battery for either stacked or wound cell designs.

FIG. 7 illustrates only the first layers of the separators 720, 722 extending beyond the lateral edges of the anode active materials 712, 714 and contacting current collector 710. It is to be understood that in alternative configurations the second layers of the separators 725, 727, or both the first and second layers, may extend beyond the lateral edges of the anode active materials. However, as noted previously, in some embodiments the second layer of the separators 725, 727 may not be complete coatings, and may be discontinuous across the surface of the electrode. Accordingly, such a discontinuous coating may not provide the encapsulation of first layer separators 720, 722, which may be complete across the surface of the anode active materials 712, 714.

Figure 8:
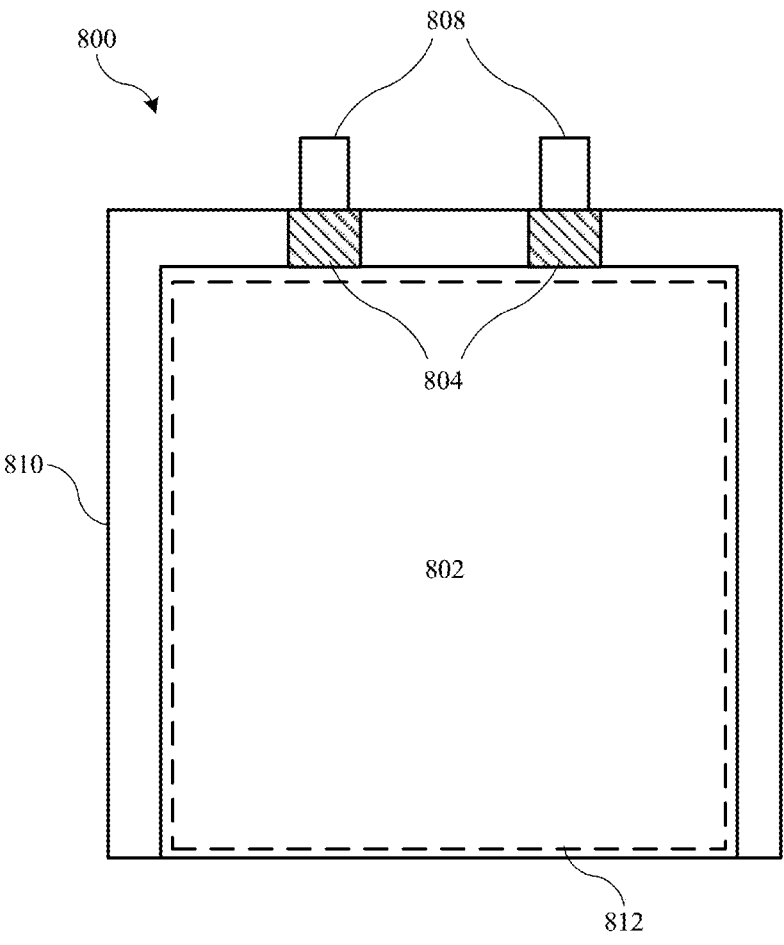
FIG. 8 shows a simplified top-down view of a battery cell that includes one or more of the present battery components according to embodiments of the present technology.

FIG. 8 shows another example of a battery cell 800 that includes battery components according to embodiments of the present technology. In the example shown, battery cell 800 may correspond to a lithium-ion or lithium-polymer battery cell that is used to power a device used in a consumer, medical, aerospace, defense, and/or transportation application. The battery cell 800 may include a stack 802 containing a number of layers that include a cathode with a cathode active coating, an embodiment of the present battery separator, and an anode with an anode active coating. More specifically, the stack 802 may include one strip of cathode active material (e.g., aluminum foil coated with a lithium compound) and one strip of anode active material (e.g., copper foil coated with carbon). The stack 802 may also include a battery separator that includes a ceramic layer, and in some embodiments a microporous polymer membrane or non-woven fabric mat. In further embodiments, the battery separator may be disposed between the cathode active material and the anode active material. The cathode, anode, and battery separator may be arranged as layers that are left flat in a planar configuration or may be wrapped into a wound configuration (e.g., a "jelly roll").

In embodiments, the battery cell 800 further includes an electrolyte to act as a medium in which ionic charge carriers (e.g., $Li^+$ ions) can be transported through the battery separator between the cathode and anode active materials. In further embodiments, the electrolyte may be a fluid or a solid polymer. In still further embodiments the electrolyte may include one or more compounds such as propylene carbonate, ethylene carbonate, dimethyl carbonate, diethyl carbonate, and ethyl-methyl carbonate. In yet further embodiments when battery cell 800 is a Li-ion or Li-polymer battery cell, one or more lithium-containing salts may be dissolved in the electrolyte. Example of these lithium-containing salts include $LiPF_6$, $LiBF_4$, $LiCO_4$, $LiSO_3CF_3$, $LiN(SO_2CF_3)_2$, $LiBC_4O_8$, $Li[PF_3(C_2CF_5)_3]$, and $LiC(SO_2CF_3)_3$, among other Li-containing salts.

During assembly of the battery cell 800, the stack 802 may be enclosed in a flexible pouch. The stack 802 may be in a planar or wound configuration, although other configurations are possible. The flexible pouch may be formed by folding a flexible sheet along a fold line 812. In embodiments, the flexible sheet may be made of aluminum with a polymer film, such as polypropylene. After the flexible sheet is folded, the flexible sheet can be sealed, for example, by applying heat along a side seal 810 and along a terrace seal 808. The flexible pouch may be less than or about 120 μm thick to improve the packaging efficiency of the battery cell 800, the density of battery cell 800, or both.

The stack 802 may also include a set of conductive tabs 806 coupled to the cathode and the anode. The conductive tabs 806 may extend through seals in the pouch (e.g., formed using sealing tape 804) to provide terminals for the battery cell 800. The conductive tabs 806 may then be used to electrically couple the battery cell 800 with one or more other battery cells to form a battery pack. In embodiments, the battery pack may be formed by coupling the battery cells in a series, parallel, or a series-and-parallel configuration. Such coupled cells may be enclosed in a hard case to complete the battery pack, or may be embedded within an enclosure of a portable electronic device, such as a laptop computer, tablet computer, mobile phone, personal digital assistant (PDA), digital camera, and/or portable media player.

EXPERIMENTAL

Figure 9A:
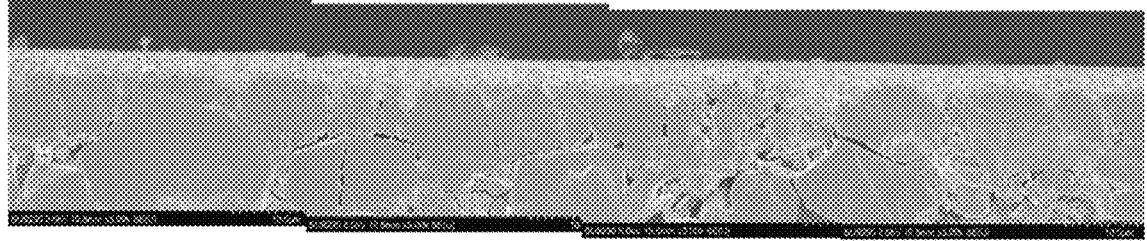
FIG. 9A shows an SEM image of a ceramic layer according to present embodiments.
Figure 9B:
FIG. 9B shows an SEM image of a comparative ceramic layer.

FIGS. 9A-B compare cross-sectional SEM images of α-alumina-containing ceramic layers characterized by different densities. The ceramic layer shown in FIG. 9A was characterized by a density of 1.68 g/cm³, while the ceramic layer of FIG. 9B was characterized by a density of 1.45 g/cm³. The SEM images show the ceramic layer in FIG. 9A was more uniform than the ceramic layer in FIG. 9B, with smaller cracks and gaps to permit dendrite growth. The comparative SEM images provide visual confirmation that embodiments of the present high-density ceramic layers, characterized by densities of greater than or about 1.5 g/cm³, have increased structural stability compared to lower-density ceramic layers.

TABLE 1 compares direct current internal resistance (DCIR) measurements taken at intervals over 300 charge-discharge cycles for two different lithium-ion battery cells. The first battery cell included a battery separator made with an α-alumina ceramic layer according to present embodiments. The α-alumina ceramic layer was made from a slurry of γ-alumina ceramic particles and a polyvinyl pyrrolidone binder composition that were mixed in a 90:10 weigh ratio of ceramic particles to binder composition. The second battery cell was a comparison cell made with a conventional battery separator made with a magnesium hydroxide ceramic layer that included 60 wt. % Mg(OH)$_2$ ceramic particles and 40 wt. % of a PVdF binder. The resistance of each battery cell was measured after the first charge-discharge cycle, as well as cycles 100, 200, and 300.

TABLE 1

| Resistance (DCIR) in Battery Cells Over 300 Charge-Discharge Cycles | | | | |
|---|---|---|---|---|
| Battery | Cycle 1 | Cycle 100 | Cycle 200 | Cycle 300 |
| Battery Cell #1 γ-Alumina Separator | 20 Ω | 29 Ω | 33 Ω | 37 Ω |
| Battery Cell #2 Mg(OH)$_2$ Separator | 29 Ω | 45 Ω | 53 Ω | 59 Ω |

TABLE 1 shows Battery Cell #1, which included the α-alumina ceramic layer separator, had an initial resistance that was 45% lower than the internal resistance of Battery Cell #2 that included the Mg(OH)$_2$ separator. The lower resistance of Battery Cell #1 was maintained over 300 charge-discharge cycles with only a slight narrowing of the difference in the resistances between the two battery cells. The measurements demonstrate that battery separators made with ceramic layers according to embodiments of the present technology can provide a significantly lower resistance to battery cells compared to conventional battery separators.

TABLE 2 compares the volume of thermal shrinkage in four different ceramic layers after exposure to a 140° C. temperature for 1 hour. Ceramic Layers #1 and #2 were made according to embodiments of the present technology. Ceramic Layer #1 was made from a slurry of γ-alumina ceramic particles and a polyvinyl pyrrolidone binder composition that were mixed in a 90:10 weigh ratio of ceramic particles to binder composition. Ceramic Layer #2 was made from a slurry of α-alumina ceramic particles having a bimodal distribution of D50 particle sizes with the first distribution having a D50 of 0.7 μm and the second distribution having a D50 of 0.2 μm. The α-alumina ceramic slurry also included a polyacrylate binder composition that was mixed with the α-alumina ceramic particles in a 90:10 weigh ratio of ceramic particles to binder composition. Ceramic Layers #3 and #4 were comparative ceramic layers that included magnesium hydroxide ceramic particles. Ceramic Layer #3 included 80 wt. % Mg(OH)$_2$ and 20 wt. % of an aramid binder, while Ceramic Layer #4 included 60 wt. % Mg(OH)$_2$ and 40 wt. % of a PVdF binder. The thermal shrinkage was measured as a percentage change in volume from the volume of the ceramic layer prior to the high-temperature exposure.

TABLE 2

| Thermal Shrinkage of Ceramic Layers After 140° C. Exposure for 1 Hour | |
|---|---|
| Ceramic Layer | Thermal Shrinkage (Δ vol. %) |
| Ceramic Layer #1 γ-alumina ceramic layer | −0.9 vol % |
| Ceramic Layer #2 α-alumina ceramic layer | +0.1 vol % |
| Ceramic Layer #3 Mg(OH)$_2$/Aramid | −7.5 vol. % |
| Ceramic Layer #4 Mg(OH)$_2$/PVdF | −19 vol. % |

TABLE 2 shows that Ceramic Layers #1 and #2 made according to embodiments of the present technology had significantly less thermal shrinkage than comparative Ceramic Layers #3 and #4. The decrease in thermal shrinkage was despite the higher or comparable porosities of Ceramic Layers #1 and #2 (i.e., 59 vol. % and 42 vol. %) compared to the porosities of comparative Ceramic Layers #3 and #4 (i.e., 42 vol. % and 48 vol. %). The lower thermal shrinkage may be ascribed in part to the reduced weight percentages of binder in Ceramic Layers #1 and #2 (i.e., 10 wt. %) compared to comparative Ceramic Layers #3 and #4 (i.e., 20 wt. % and 40 wt. %). The organic binders are not as thermal stable as the ceramic particles at the operating temperatures of a typical Li-ion rechargeable battery, and this is reflected in the thermal shrinkage data shown in TABLE 2. Battery cells that incorporate battery separators that include Ceramic Layers #1 and #2 may be characterized by longer useful lifetimes and reduced safety risks because of ceramic layers' reduced thermal shrinkage.

Figure 10:
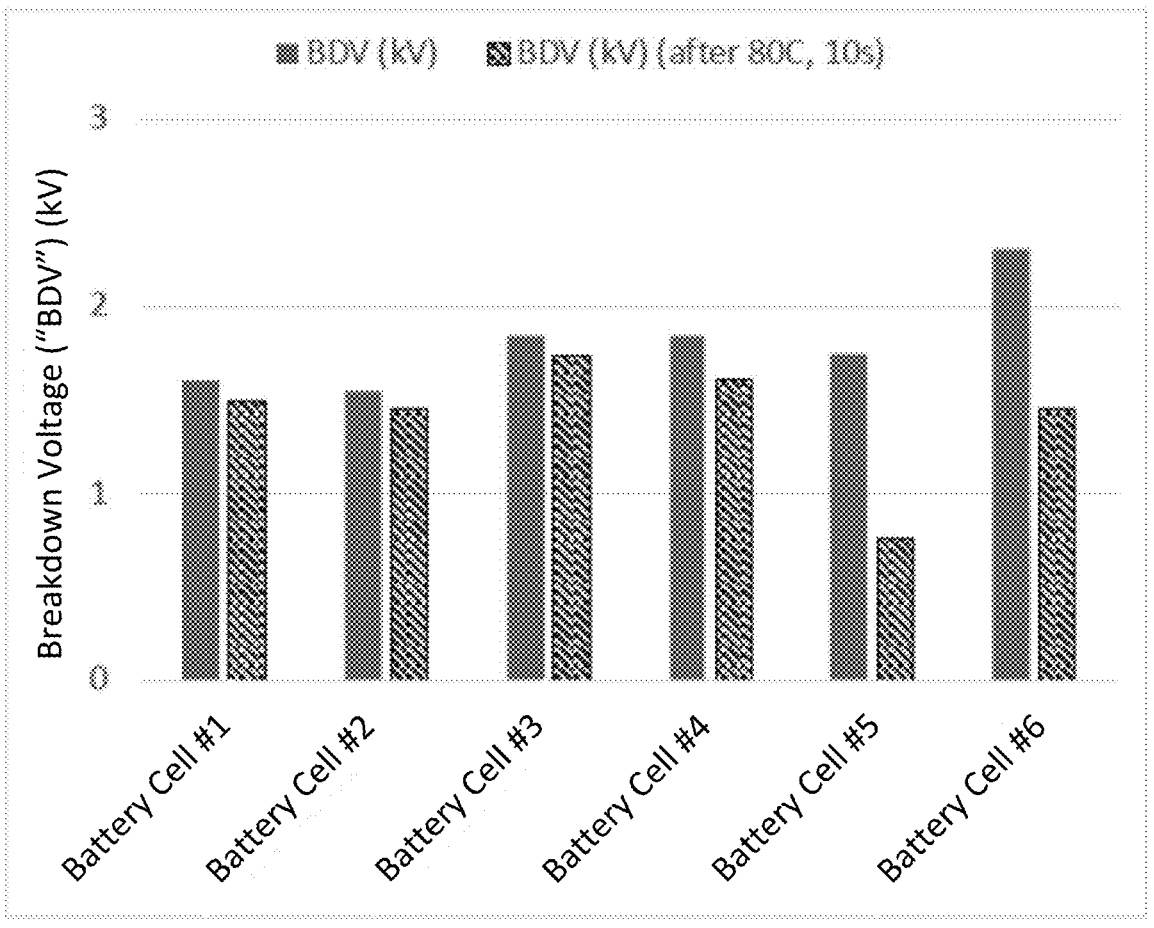
FIG. 10 shows a graph of breakdown voltages for a group of batteries after typical and high-discharge rate discharging conditions.

The reduced thermal shrinkage of ceramic layers according to embodiments of the present technology can also increase the performance of battery cells at higher charging and discharging rates (e.g., C-Rates) where the cells can experience higher temperatures. One measure of high C-rate performance in a battery cell is the level of retention in the cell's breakdown voltage after a high rate charge-discharge cycle. The less reduction in the measured breakdown voltage after a high rate charge-discharge cycle (e.g., a high C-Rate cycle) the more improved the battery cell's performance at high C-Rates. FIG. 10 is a bar graph comparing the breakdown voltages (in kV) of six battery cells before and after they undergo a 80 C (10 second) charge-discharge cycle. Battery Cells #1-4 include battery separators made according to embodiments of the present technology. Battery Cells #1 and #2 include separators that include ceramic layers made with γ-alumina ceramic particles and organic binders in a 90:10 weight ratio. Battery Cells #3 and #4 include separators made with α-alumina ceramic particles and organic binders in a 90:10 weight ratio. Comparative Battery Cells #5 and #6 include separators made with magnesium hydroxide ceramic particles and organic binders in 80:20 and 60:40 weight ratios, respectively. FIG. 10 shows that comparative Battery Cells #5 and #6 had a larger percentage drop in breakdown voltage after a 80 C (10 second) charge-discharge cycle than any of Battery Cells #1-4 that included battery separators made according to embodiments of the present technology.

These measurements are consistent with the differences in the thermal shrinkages measured in TABLE 2 for the present and comparative ceramic layers. Battery Cells #1-4 in FIG. 10, made with the present battery separators, experienced less change in volume (e.g., thermal shrinkage) after an 80 C charge-discharge cycle that significantly increased the cells' temperatures. The increased thermal stability of Battery Cells #1-4 was reflected in the smaller changes to their breakdown voltages after the 80 C charge-discharge cycle. In contrast, Battery Cells #5-6, made with conventional battery separators, likely experienced a much larger change in volume (e.g., thermal shrinkage) after the 80 C charge-discharge cycle, which explains their larger change in their breakdown voltages after the 80 C charge-discharge cycle.

The retention in breakdown voltage is one of many battery cell performance improvements resulting from the increased thermal stability of battery components that include ceramic layers according to the present technology. Another performance improvement can be measured in the increased retention of the battery cell's energy capacity over many charge-discharge cycles. TABLE 3 compares the energy capacity of two battery cells over 300 charge-discharge cycles. Battery Cell #1 had a battery separator that included a ceramic layer of γ-alumina ceramic particles and a polyvinyl pyrrolidone binder in a 90:10 weight ratio. Comparative Battery Cell #2 has a conventional battery separator that included a ceramic layer of $Mg(OH)_2$ ceramic particles and PVdF binder in a 60:40 weight ratio. The energy capacity (in Ah) of each battery cell was measured after the first charge-discharge cycle, as well as cycles 100, 200, and 300.

TABLE 3

| Energy Capacity (in Ah) in Battery Cells Over 300 Charge-Discharge Cycles | | | | |
| --- | --- | --- | --- | --- |
| Battery | Cycle 1 | Cycle 100 | Cycle 200 | Cycle 300 |
| Battery Cell #1 γ-Alumina Separator | 0.38 Ah | 0.36 Ah | 0.35 Ah | 0.34 Ah |
| Battery Cell #2 $Mg(OH)_2$ Separator | 0.38 Ah | 0.35 Ah | 0.32 Ah | 0.31 Ah |

TABLE 3 shows Battery Cell #1 retaining about 12% more energy capacity over 300 cycles compared to Battery Cell #2. This is consistent with other measurements of the lower resistance and higher thermal stability of battery components that include ceramic layers according to embodiments of the present technology. The improved resistance and thermal stability of these ceramic layers increases the energy retention capacity of a battery cell that includes battery components made with these ceramic layers, such as a battery separator. The increased energy retention of these battery cells over the hundreds of cycles measured shows that the improved battery separator designs according to the present technology can improve a battery cell's lifetime performance and lifespan when compared to cells that use conventional battery separator designs.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the layer" includes reference to one or more layers and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery component comprising:
a ceramic layer comprising ceramic particles and a binder, wherein the ceramic particles comprise:
(i) α-alumina ceramic particles having a bifurcated distribution of particle size, wherein a first portion of the α-alumina ceramic particles are characterized by a first D50 particle size distribution of greater than or about 0.5 μm, and a second portion of the α-alumina ceramic particles are characterized by a second D50 particle size distribution of less than or about 0.4 μm, and the first and the second portions of the α-alumina ceramic particles have a weight ratio range of 95:5 to 40:60, or
(ii) γ-alumina ceramic particles characterized by a D50 particle size distribution of less than or about 0.3 μm and a mean pore size of less than or about 0.05 μm, the ceramic layer is characterized by a porosity of greater than or about 40 vol %, and
the battery component is characterized by a MacMullin number of less than or about 40.

2. The battery component of claim 1, wherein the ceramic layer comprises greater than or about 50 wt. % of the α-alumina ceramic particles, and wherein the ceramic layer has a density greater than or about 1.5 $g/cm^3$.

3. The battery component of claim 2, wherein the α-alumina ceramic particles are characterized by a mean pore size of less than or about 0.2 μm.

4. The battery component of claim 1, wherein the ceramic layer comprises greater than or about 50 wt. % of the γ-alumina ceramic particles, and wherein the ceramic layer has a density less than or about 0.5 $g/cm^3$.

5. The battery component of claim 4, wherein the ceramic layer is characterized by a hydrogen fluoride gas absorption capacity of greater than or about 5 mg HF per gram of the ceramic layer.

6. A battery comprising the battery component of claim 1, wherein the battery component is a battery separator incorporated into the battery, and wherein the battery is characterized by a capacity retention of greater than or about 90% after 300 charge-discharge cycles.

7. A battery separator comprising:

a ceramic layer comprising ceramic particles and a binder, wherein the ceramic particles comprise:

(i) α-alumina ceramic particles having a bifurcated distribution of particle size, wherein a first portion of the α-alumina ceramic particles are characterized by a first D50 particle size distribution of greater than or about 0.5 μm, and a second portion of the α-alumina ceramic particles are characterized by a second D50 particle size distribution of less than or about 0.4 μm, and the first and the second portions of the α-alumina ceramic particles have a weight ratio range of 95:5 to 40:60, or (ii) γ-alumina ceramic particles characterized by a D50 particle size distribution of less than or about 0.3 μm and a mean pore size of less than or about 0.05 μm, a weight ratio of ceramic particles to binder is greater than or about 90:10, and the battery separator is characterized by a thermal shrinkage of less than or about 1 vol. % after 1 hour at 140° C.

8. The battery separator of claim 7, wherein the binder is characterized by a glass transition temperature of greater than or about 80° C.

9. The battery separator of claim 7, wherein the binder is selected from the group consisting of polyvinyl pyrrolidone, polyvinyl alcohol, and polyacrylate.

10. The battery separator of claim 7, wherein the binder further comprises a dispersant.

11. The battery separator of claim 7, wherein the ceramic layer comprises greater than or about 90 wt. % γ-alumina ceramic particles or greater than or about 90 wt. % α-alumina ceramic particles.

12. The battery separator of claim 11, wherein the battery separator has a porosity of greater than or about 40 vol %.

13. A method of making a battery separator, the method comprising:

combining ceramic particles and a binder composition into a ceramic slurry, wherein the ceramic particles comprise α-alumina or γ-alumina, and wherein the ceramic slurry has a 25° C. viscosity of less than or about 1000 cP;

forming the ceramic slurry into a green-body ceramic layer; and curing the green-body ceramic layer to form a cured ceramic layer, wherein the cured ceramic layer comprises:

(i) α-alumina ceramic particles having a bifurcated distribution of particle size, wherein a first portion of the α-alumina ceramic particles are characterized by a first D50 particle size distribution of greater than or about 0.5 μm, and a second portion of the α-alumina ceramic particles are characterized by a second D50 particle size distribution of less than or about 0.4 μm, and the first and the second portions of the α-alumina ceramic particles have a weight ratio range of 95:5 to 40:60, or (ii) γ-alumina ceramic particles characterized by a D50 particle size distribution of less than or about 0.3 μm and a mean pore size of less than or about 0.05 μm, wherein a weight ratio of ceramic particles to binder is greater than or about 90:10, and wherein the battery separator is characterized by a thermal shrinkage of less than or about 1 vol. % after 1 hour at 140° C.

14. The method of claim 13, wherein the binder composition comprises:

water; and a binder selected from the group consisting of polyvinyl pyrrolidone, polyvinyl alcohol, and polyacrylate.

15. The method of claim 13, wherein the green-body ceramic layer is formed on a base layer comprising an organic polymer that is part of the battery separator.

16. The method of claim 13, wherein the green-body ceramic layer is formed on an electrode of a battery.

17. The method of claim 13, wherein the cured ceramic layer comprises greater than or about 90 wt. % γ-alumina ceramic particles or greater than or about 90 wt. % α-alumina ceramic particles, and the cured ceramic layer is characterized by a porosity of greater than or about 40 vol %.

18. The method of claim 13, wherein the battery separator is characterized by a MacMullin number of less than or about 40.

\*    \*    \*    \*    \*